May 22, 1962 D. McCULLEY 3,035,836
MEANS OF STAGING PRODUCTIONS
Filed July 28, 1958

Inventor
Dale McCulley

United States Patent Office 3,035,836
Patented May 22, 1962

3,035,836
MEANS OF STAGING PRODUCTIONS
Dale McCulley, Lake Zurich, Ill., assignor to Cavalcade Productions, Incorporated, Lake Zurich, Ill., a corporation of Illinois
Filed July 28, 1958, Ser. No. 751,286
3 Claims. (Cl. 272—10)

This invention relates to means for presenting a dramatic production and more particularly to a means affording integration of live and filmed action on a stage wherein a translucent image receiving medium is positioned intermediate the front and rear boundaries of a stage and a projector is positioned in back of the medium for projecting a moving scene on the medium which is visually accessible to an audience in front of the stage.

Heretofore, two dramatic media have been available each having a distinctive character shaping the setting and personnel of a production as well as the audience impact therefrom. The stage, as the oldest of the media, has provided a tradition for motion pictures, the other of the media, but the motion picture presentation provides a number of features which are entirely lacking in a stage production. These features include continuity of presentation, unlimited variability of the apparent size of objects shown, corresponding variation in sound, and mobility in time and space as illustrated for example in the "mob scene" type of incident which at most could be only suggested on a stage. Additionally, a moving picture has the advantage of affording any desired number of performances of identical nature, in a manner which is impossible where the human element plays a part.

Nevertheless, the stage has continued as an important influence, a fact which may be accounted for by the factor of the living contact between audience and performer.

The present invention permits the two media of stage and screen to be combined in an integrated production wherein both live and filmed action augment each other to produce a unified dramatic event. Although limited use of non-permanent scenery has been achieved heretofore, as in the use of a slide to project a stationary image forming an element of a stage scene, there has been no attempt or method to combine filmed and live action in a stage setting for theater audiences or industrial shows. In accordance with the invention, the combination described is achieved by forming and positioning an image receiving medium such as a translucent screen intermediately of the front and rear of a stage, preferably with a spacing from the front of the stage sufficient to permit actors to perform in front of the screen or medium. The medium is dimensioned to occupy substantially a major portion of the stage, along its lateral axis. In order to effect the formation of moving events on the medium, a high intensity movie projector is positioned at the rear of the stage in predetermined spaced relation to the medium such as to fill substantially the entire visually accessible surfaces thereof with the action. In one embodiment of the invention, the translucent medium may be provided by means of flowing a continuous sheet of a light-pervious gas such as carbon dioxide from a laterally extending source above the stage to receiving means in the floor of the stage. In another embodiment, opposed parallel transparent plates of suitable plastic or reinforced glass material are positioned in proximate relation intermediate the front and rear of the stage so as to confine an image receiving medium such as smoke. In still another embodiment, a curtain of moving air is passed by suitable blower means from the bottom to the top of the stage, in a similar position and a medium such as smoke is injected into the flow of air to provide the image receiving means. In these several embodiments, the medium affords a "three dimensional" effect by virtue of its thickness and light-permeability. However, as indicated, the medium may be a translucent screen heretofore utilized to present an image on one surface thereof where the scene is projected onto the other surface thereof, in accordance with the understanding of those skilled in the art. A preferred construction for embodying the invention includes the provision of a forward stage area or "down stage" area which defines a floor surface spaced above the floor surface of the rear or off stage portion of the stage by a predetermined amount and with steps leading from the lower stage portion at the rear to the front stage portion, whereby live action may be introduced from the rear or picture area to the downstage portion of the stage. In this embodiment the translucent medium is preferably disposed across the lower stage area in proximate upstanding relationship to the stair area and a frame is disposed between the front and the rear boundaries of the relatively elevated stage area and dimensioned to mask the projected image and to define the area within which live action will occur, i.e., the entire stage visible from the audience section of the theater. This frame may be used where the stepped stage construction is not available also, and it will be appreciated that the medium for receiving projected images from the cinema projector and the frame for the scene thereby projected on the medium cooperate in providing an integrated scene adapted to be combined with live action, the spacing of the respective elements being determined in accordance with the dimensions of the stage. In practicing the invention, it is preferred that the area immediately in front of the medium be relatively dark or dim while the down stage area should be lit to a standard degree of brightness so that the meshing of filmed and live action may be achieved most effectively.

It is therefore an object of the present invention to provide a means for producing a dramatic stage production wherein a translucent image receiving medium is disposed intermediate the front and rear of the stage so as to form a major portion of the visually accessible area of the stage.

Another object of the invention is to provide a stage means as described wherein a cinema projector is positioned a distance rearwardly of the image receiving medium such that substantially the full surface areas of the medium may receive a moving image from the projector.

Another object of the invention is to provide a stage means as described wherein a frame for the medium is disposed in front of the medium and in predetermined spaced relationship thereto such as to mask the medium and cooperate with live action which may take place either in front or to the rear of the frame and in front of the medium in producing an integrated scene.

Another object of the invention is to provide a means and method of staging a production wherein a substantially gaseous, light-pervious, image-receiving medium is utilized to receive moving images from a projector.

In the event the medium is afforded by the curtain of carbon dioxide, or the like, it will be appreciated that action could take place to the front or to the rear of the curtain, and that the actors could pass therethrough if desired. Also, the curtain could be selectively removed and replaced at will.

Other objects and advantages of the invention will become apparent as the description proceeds in accordance with the drawings in which.

Figure 1:
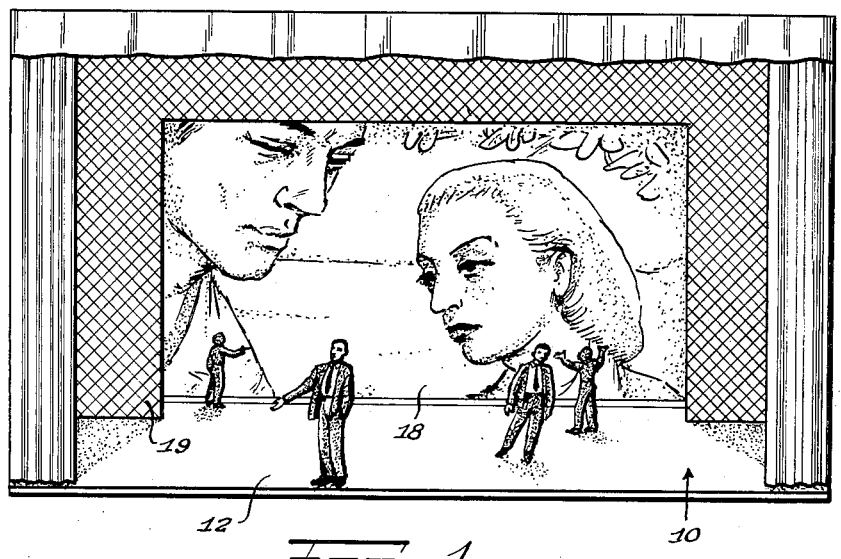
FIGURE 1 is a front elevational view of a stage construction according to the present invention.
Figure 2:
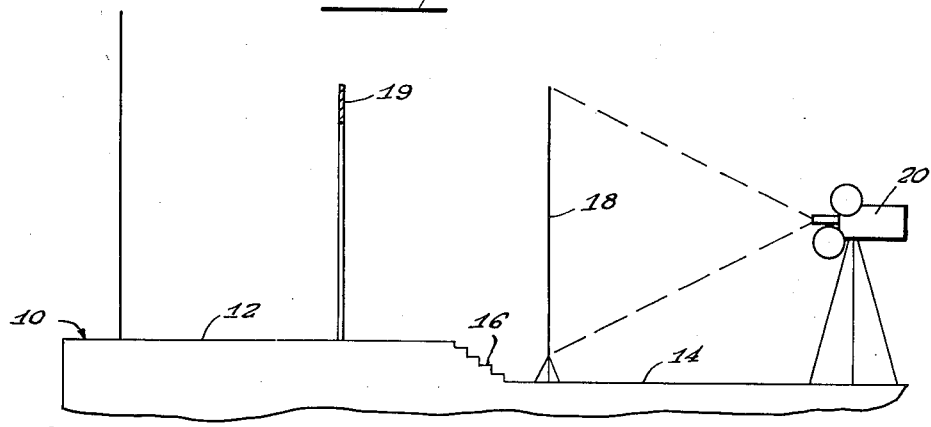
FIGURE 2 is a schematic end view of the construction shown in FIGURE 1.
Figures 3, 4:
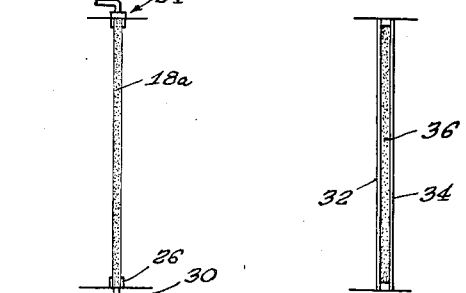
FIGURE 3 is a diagrammatic showing of one embodiment of translucent image receiving means according to the invention.
FIGURE 4 is another embodiment of the same.

Referring now to FIGURES 1 through 3 the invention contemplates the provision of a stage 10 which is preferably formed with a forward or downstage area 12 in which live action may take place and a rearward offstage area 14 which is displaced downwardly a predetermined extent relative to the forward area and interconnected therewith by means of steps 16 by which the actors can proceed from the rear of the stage where they will be relatively protected from view, to the area 12. It will, however, be understood that the stage may have a uniform level if desired. A translucent image receiving medium 18 is disposed intermediately of the front and rear of the stage 10 and is dimensioned to extend substantially across a major portion of the stage. The medium may, if desired, also define with the stage area side areas in which action may take place, and in one embodiment is a translucent screen of a type such as is known to those skilled in the art, wherein an image projected on one surface thereof is visible upon the other surface. In accordance with the conception of the invention, a high intensity moving picture projector 20 is displaced rearwardly of the medium 16 a distance such as to permit the surface of the screen to be filled with the moving image from the projector, and, as stated, visible to an audience in front of the stage by virtue of the translucent characteristic of the screen or medium 18.

In order to afford a depth characteristic for the scene and to integrate the live and filmed action projected on the medium 18, a panelled frame construction 19 is disposed in masking relationship with the sides and the upper portion of the medium 18 and is spaced forwardly therefrom, preferably intermediate the front and rear of the forward stage portion 12.

In another embodiment of the invention as diagrammatically seen in FIGURE 3, the medium 18a is formed by means of a current of air passing from the upper portion of the stage to the lower portion, or vice versa, transversely extending blower structure 24 and vacuum ducts 26 of the type used in forming "invisible doors" for super markets or the like being used for this purpose. The blower structure 24 and vacuum means 26 may be of any suitable type, and in order to provide the image receiving medium smoke or other light, particulate matter is introduced into the curtain of air thus formed by suitable feed means such as feed pipes or the like 28 in association with the blower means 24.

In another form of the invention, carbon dioxide or other relatively heavy, visible gas is fed downwardly at a moderate rate from the feed pipes 28 of the stage ceiling, and drawn off by outlet pipes 30 in the floor of the stage to provide a similar image receiving curtain.

In yet another embodiment, parallel, proximately spaced transparent partitions 32 and 34 of glass, plastic or other suitable material are positioned across the entire transverse and vertical extent of the stage and joining to the wall, ceiling and floor structures to confine a medium 36 such as smoke or the like. If desired, blower and vacuum means may be used therewith to remove or introduce the medium at will.

With the undefined curtain or medium, the removal and replacement thereof may also be accomplished as described, and the further advantage is afforded of unlimited accessibility to all areas of the stage, since the actors may even pass through the medium itself. Also, a plurality of moving picture projectors may be disposed at various angles and positions relative to the medium and operated sequentially or simultaneously.

There has thus been provided a means and method of staging a production in which live and filmed action are combined on a stage of suitable dimensions for a dramatic or industrial show production. The events which may thus be produced are infinite in range affording various combinations and types of contrast views of the actors in film and live, as well as both filmed and actual representations of industrial show subjects such as automobiles.

The possibilities inherent in my system and method are believed to have been set forth at sufficient length for purposes of describing their scope and operation and although I have herein set forth and described my invention with respect to certain specific principles and details thereof, it will be understood by those skilled in the art that these may be varied without departing from the spirit and scope of the invention as set forth in the hereunto appended claims.

I claim as my invention:

1. A theatrical construction for presenting integrated live and filmed action to a theatrical audience comprising a stage structure having a downstage area, an offstage area, and a plurality of steps leading upwardly from said offstage area to said downstage area, a translucent image-receiving medium extending across a major portion of the offstage area at a forward location thereof, said translucent image-receiving medium being characterized by an effective width sufficient to produce a three-dimensional effect for images projected thereon from the rear thereof, a frame structure on said downstage area masking at least the top and side marginal portions of the translucent image-receiving medium and located toward the rear of the downstage area in spaced relation to the translucent image-receiving medium such as to integrate live action on the downstage area with images on the translucent image-receiving medium, and to impart an impression of depth to the integrated action thus produced, and a projector in back of said translucent image-receiving medium and on said offstage area located to project a visually readily accessible moving cinema image on the rear of said translucent image-receiving medium for viewing in conjunction with live action from the front of the translucent image-receiving medium.

2. The structure according to claim 1 wherein said translucent image-receiving medium is a flowing sheet of visible gas.

3. The structure according to claim 1 wherein said translucent image-receiving medium is smoke confined between opposed, parallel transparent plates.

References Cited in the file of this patent

UNITED STATES PATENTS

| | | |
|---|---|---|
| 1,356,140 | Hall | Oct. 19, 1920 |
| 1,422,149 | Troeger | July 11, 1922 |
| 1,446,266 | Murray | Feb. 20, 1923 |
| 1,536,421 | Carroll | May 5, 1925 |
| 1,631,240 | Amet | June 7, 1927 |
| 1,813,559 | Bouchspies | July 7, 1931 |
| 1,933,854 | Jelinek | Nov. 7, 1933 |
| 2,027,028 | Douden | Jan. 7, 1936 |
| 2,906,169 | Saffir | Sept. 29, 1959 |

FOREIGN PATENTS

| | | |
|---|---|---|
| 8,705 | Great Britain | of 1913 |
| 90,719 | Switzerland | Sept. 16, 1921 |
| 429,860 | France | July 28, 1911 |
| 805,939 | France | Sept. 7, 1936 |
| 448,823 | Germany | Feb. 18, 1928 |